US011968518B2

(12) United States Patent
Giron et al.

(10) Patent No.: US 11,968,518 B2
(45) Date of Patent: Apr. 23, 2024

(54) APPARATUS AND METHOD FOR GENERATING SPATIAL AUDIO

(71) Applicant: Sony Group Corporation, Tokyo (JP)

(72) Inventors: Franck Giron, Stuttgart (DE); Michael Enenkl, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 199 days.

(21) Appl. No.: 17/437,046

(22) PCT Filed: Mar. 25, 2020

(86) PCT No.: PCT/EP2020/058379

§ 371 (c)(1),
(2) Date: Sep. 8, 2021

(87) PCT Pub. No.: WO2020/200964

PCT Pub. Date: Oct. 8, 2020

(65) Prior Publication Data

US 2022/0182776 A1 Jun. 9, 2022

(30) Foreign Application Priority Data

Mar. 29, 2019 (EP) .................................... 19166332

(51) Int. Cl.
*H04S 7/00* (2006.01)
*H04R 3/12* (2006.01)

(52) U.S. Cl.
CPC ............... *H04S 7/303* (2013.01); *H04R 3/12* (2013.01); *H04S 2400/01* (2013.01); *H04S 2400/13* (2013.01)

(58) Field of Classification Search
CPC .. H04S 7/303; H04S 2400/01; H04S 2400/13; H04S 2420/13; H04R 3/12; H04R 3/04; H04R 3/06; H04R 3/08
See application file for complete search history.

(56) References Cited

U.S. PATENT DOCUMENTS

2006/0109988 A1* 5/2006 Metcalf .................. H04S 3/002 381/310
2006/0280311 A1 12/2006 Beckinger et al.
2012/0237063 A1 9/2012 Korn
2014/0095997 A1* 4/2014 Vu ..................... G06F 3/04842 715/716
2014/0219455 A1 8/2014 Peters et al.
(Continued)

OTHER PUBLICATIONS

International Search Report and Written Opinion dated May 29, 2020, received for PCT Application PCT/EP2020/058379, Filed on Mar. 25, 2020, 9 pages.

*Primary Examiner* — Jason R Kurr
(74) *Attorney, Agent, or Firm* — XSENSUS LLP

(57) ABSTRACT

The present disclosure pertains to an apparatus comprising circuitry configured to: determine a loudspeaker dependent spread factor for at least one individual loudspeaker of a loudspeaker arrangement, wherein the loudspeaker dependent spread factor depends on a specification of the at least one individual loudspeaker; and 5 control the outputs of the loudspeakers of the loudspeaker arrangement based on the loudspeaker dependent spread factor for the at least one individual loudspeaker to generate at least one virtual sound source.

20 Claims, 5 Drawing Sheets

(56) References Cited

U.S. PATENT DOCUMENTS

| | | | | |
|---|---|---|---|---|
| 2016/0037282 | A1* | 2/2016 | Giron | H04S 7/30<br>381/303 |
| 2017/0134877 | A1 | 5/2017 | Faller et al. | |
| 2018/0160250 | A1* | 6/2018 | Yamamoto | H04S 7/303 |

* cited by examiner

APPARATUS AND METHOD FOR GENERATING SPATIAL AUDIO

CROSS-REFERENCE TO RELATED APPLICATIONS

The present application is based on PCT filing PCT/EP2020/058379, filed Mar. 25, 2020, which claims priority to EP 19166332.7, filed Mar. 29, 2019, the entire contents of each are incorporated herein by reference.

TECHNICAL FIELD

The present disclosure generally pertains to an apparatus and a method for the operation of spatial audio techniques.

TECHNICAL BACKGROUND

Current systems for the generation of a spatial sound field, like wavefield synthesis, typically require a relatively large number of acoustic devices, mostly available in the form of a set of loudspeakers. The equations used for the derivation of such systems are funded on the wish to reproduce the sound field as exactly as possible.

Known systems are, for example, the so-called 5.1 or 7.1 systems, which are composed of 5 or 7 loudspeakers and one or two extra subwoofers, which are designed to reproduce the low frequency range of sound with a higher energy. However, for such systems it is known that they may be limited in their capacity to generate a perceptually well-balanced timbre of the desired soundfield, such that the listener has to be placed in a relatively centered area.

For example, in a car environment where loudspeakers are placed at different heights, such as a woofer placed at the bottom of the car and a tweeter placed at the dashboard, a resulting wavefield (e.g. a monopole sound source) may be imbalanced depending on its position with respect to the loudspeakers. For example, if a monopole sound source is placed at a high position, high frequencies may be predominant, whereas low frequencies may be predominant, if the sound source is placed at a low position, and a balancing of the frequencies may only be achieved at predetermined positions of a monopole sound source.

Furthermore, other systems are known which try to recreate the sound field physically in the same way as if the real sound source would be present, such as the so-called wavefield synthesis, as already introduced above. Here, a reproduction of a sound field is based on the Huygens principle, and the sound field is approximated with a number of loudspeakers. Such methods may involve a relative high computational complexity, and, thus, approximations may be provided, such as monopole synthesis, which, however, may lead to inaccuracies in the generated wavefield.

SUMMARY

Although there exist techniques for monopole synthesis, it is generally desirable to provide an apparatus and a method pertaining to generate a perceptually well-balanced timbre of the desired soundfield According to a first aspect, the disclosure provides an apparatus comprising a circuitry, wherein the circuitry is configured to determine a loudspeaker dependent spread factor for at least one individual loudspeaker of a loudspeaker arrangement, wherein the loudspeaker dependent spread factor depends on a specification of the at least one individual loudspeaker; and control the outputs of the loudspeakers of the loudspeaker arrangement based on the loudspeaker dependent spread factor for the at least one individual loudspeaker to generate at least one virtual sound source.

According to a second aspect, the disclosure provides a method, comprising determining a loudspeaker dependent spread factor for at least one individual loudspeaker of a loudspeaker arrangement, wherein the loudspeaker dependent spread factor depends on a specification of the at least one individual loudspeaker; and controlling the outputs of the loudspeakers of the loudspeaker arrangement based on the loudspeaker dependent spread factor for the at least one individual loudspeaker to generate at least one virtual sound source.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 5:
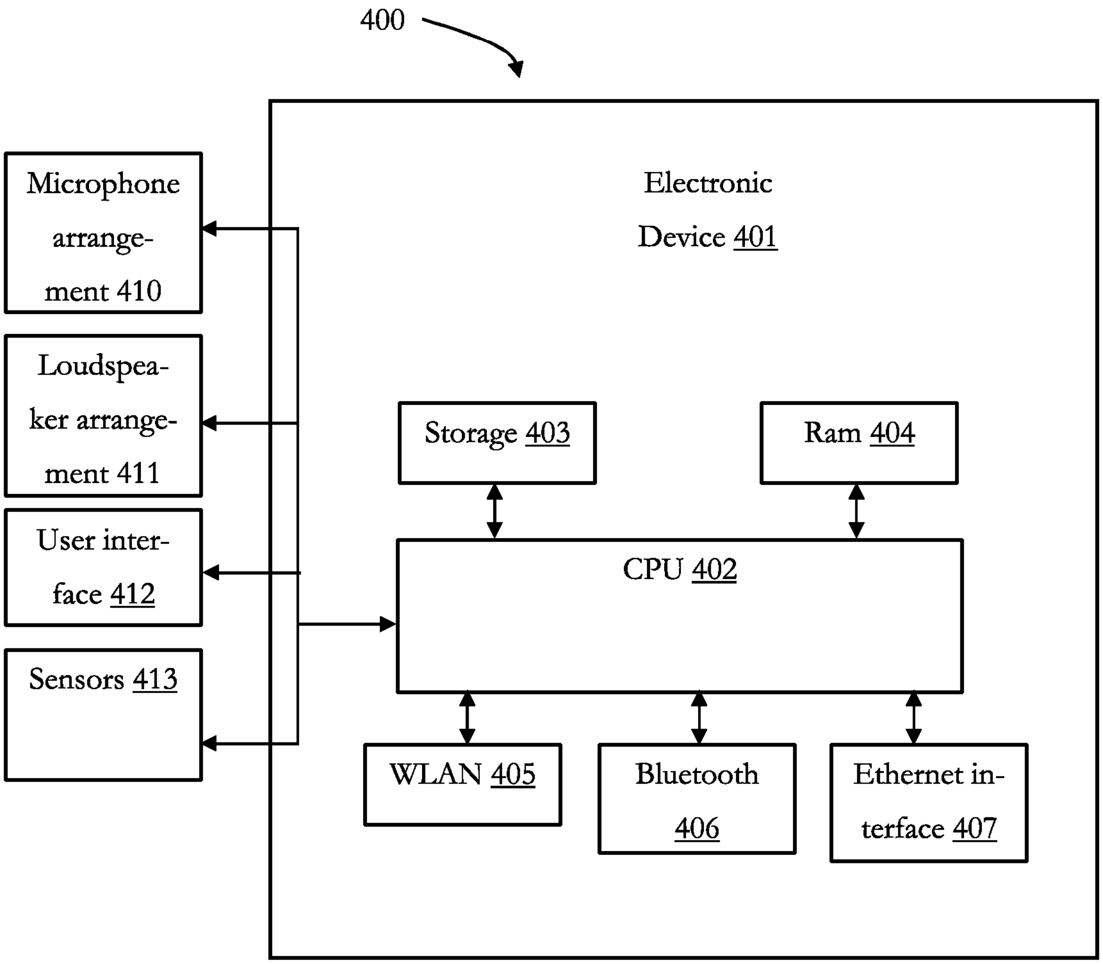
FIG. 5 depicts an electronic device for controlling an audio system according to an embodiment of the present disclosure.

Before a detailed description of the embodiments under reference of FIG. 5 is given, some general explanations are made.

As mentioned in the outset, known techniques may be limited in their capacity to generate a perceptually well-balanced timbre of the desired sound field and, thus, some embodiments, pertain to improving the listener's perception of the timbre within monopole synthesis applications.

Hence, some embodiments pertain to an apparatus including circuitry configured to generate a signal to determine a loudspeaker dependent spread factor for at least one individual loudspeaker of a loudspeaker arrangement, wherein the loudspeaker dependent spread factor depends on a specification of the at least one individual loudspeaker; and control the outputs of the loudspeakers of the loudspeaker arrangement based on the loudspeaker dependent spread factor for the at least one individual loudspeaker to generate at least one virtual sound source.

The circuitry configured to control a loudspeaker arrangement (or the apparatus which is suitable for controlling a loudspeaker arrangement) may include any of an electronic device, a processor, a computer, an electronic amplifier, such as a unilateral amplifier, bilateral amplifier, inverting amplifier, non-inverting amplifier, a servo amplifier, a linear amplifier, a non-linear amplifier, a wideband amplifier, a radio frequency amplifier, an audio amplifier, resistive-capacitive coupled amplifier (RC), inductive-capacitive coupled amplifier (LC), transformer coupled amplifier, direct coupled amplifier, or the like. The apparatus may further be or comprise a 3D or spatial audio rendering system performing a 3D or spatial audio rendering operation, such as ambisonics, soundfield synthesis systems, surround sound systems, or the like. Moreover, the apparatus may be stand-alone or it may be integrated in another apparatus/device.

For instance, a 3D audio rendering operation is based on wavefield synthesis, wherein wavefield synthesis techniques may be used to generate a sound field that gives the impression that an audio point source is located inside a predefined space.

Such an impression may be achieved by using a monopole synthesis approach that drives a loudspeaker array such that the impression of a virtual sound source is generated.

According to some embodiments, the 3D audio rendering operation is based on monopole synthesis.

The theoretical background of this technique, which is used in some embodiments, is described in more detail in patent application US 2016/0037282 A1 that is herewith incorporated by reference.

The technique which is implemented in the embodiments of US 2016/0037282 A1 is conceptually similar to the wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

According to the embodiments, the virtual sound source is associated with a specification of an (at least one) individual loudspeaker, such as a directivity pattern, a frequency range, or the like. Directivity may be achieved by superimposing multiple monopoles and it may describe the change of a loudspeaker's frequency response, wherein the frequency and/or the frequency response may depend on an angle of the loudspeaker.

The circuitry of the apparatus may include a processor (or multiple processors), a memory (RAM, ROM or the like), a memory and/or storage, interfaces, etc. Circuitry may include or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, the circuitry may include or may be connected with sensors for sensing still images or video image data (image sensor, camera sensor, video sensor, etc.), for sensing environmental parameters (e.g. radar, humidity, light, temperature), etc.

The determination of a loudspeaker dependent spread factor may include determining properties of at least one loudspeaker of a loudspeaker arrangement, like determining a type of loudspeaker, i.e. a subwoofer, a woofer, a mid-woofer, a tweeter, or the like. The determination may include determining loudspeaker specific coefficients/specifications, such as a directivity pattern as mentioned below, a type of membrane, a resonance frequency, or the like. The determination may include determining a position of the loudspeaker relative to other loudspeakers, to a virtual sound source, to a listener, or the like. The determination may include angular information about the loudspeaker, such as the orientation of the individual loudspeaker, an emitting angle of the individual loudspeaker, or the like.

The loudspeaker dependent spread factor may be applied to modulate a sound signal or wave emitted by a loudspeaker which generates or contributes to generating a virtual sound source. Thereby, parameters of the signal may be changed depending on a position of the sound signal or wave propagating through the room or space. For example, the gain of the sound signal or wave may be increased/decreased in dependence of the distance to the virtual sound source, or the gain may be adjusted based on obstacles or other objects, which are able to influence the propagation properties of the sound signal or wave. By modulating the sound signal or wave, a uniform distribution of a soundfield may be achieved.

The loudspeaker dependent spread factor may include the determined properties of an individual loudspeaker of the loudspeaker arrangement, specifically, the relative position of the individual loudspeaker relative to a user, a gain of the individual loudspeaker, wherein the gain may also include directivity information of a loudspeaker. The loudspeaker dependent spread factor may include a delay of an individual loudspeaker, wherein the delay may be a point of time relative to another point of time (e.g. receiving of a signal, or point of time at which another loudspeaker emits a sound) at which the individual loudspeaker emits a sound. The delay may be based on positional information of individual loudspeakers relative to each other, to a virtual sound source, to a listener, or the like.

The loudspeaker arrangement may be a plurality of at least two individual loudspeakers, wherein the individual loudspeakers may be arbitrarily (e.g. also randomly or in a predetermined manner) distributed in a room, several rooms, outside of a room, outside of a house, inside a vehicle, in a headphone, in a soundbar, in a television, in a radio, in a sound system, such as a stereo system, surround system, ambisonics system, 3D audio rendering system, soundfield generating system, or the like.

The specification of the at least one individual loudspeaker of the loudspeaker arrangement may be a frequency range and/or a directivity pattern, such as an angular dependency of the intensity of emitted sound waves. The angular dependency may be a dependency of a spherical angle, a solid angle, a spatial angle, or the like. The directivity pattern may include an omnidirectional pattern, a directional pattern, a super-directional pattern, a bidirectional pattern, a figure eight pattern, a subcardioid pattern, a cardioid pattern, a unidirectional pattern, a supercardioid pattern, a hypercardioid pattern, or the like.

In general, the specification of the at least one individual loudspeaker of the loudspeaker arrangement may be based on a simulation, implementation choices of a manufacturer, entered by a user, taken from a table, a manual, or the like.

The controlling of the outputs (i.e. the emitted sound) of the loudspeakers of the loudspeaker arrangement may include generating a control signal which may be output for transmission to the loudspeaker arrangement, and the controlling may be based on wired technology, such as optical fiber technology, electronic technology, or the like, it may be based on wireless technology, such as Bluetooth, Wi-Fi, Wireless LAN (Local Area Network), Infrared, or the like. Moreover, the controlling may be performed by a loudspeaker (or several loudspeakers), wherein the loudspeaker(s) may (each) include an apparatus as described herein (or a subset of the several loudspeakers may include the apparatus). The signal may cause at least one individual loudspeaker of the loudspeaker arrangement to emit a sound.

The sound may be emitted instantaneously after the loudspeaker receives the signal, at a predetermined point of time, or after a certain delay. The predetermined point of time may in this context be part of the signal or part of an intrinsic programming of the at least one individual loudspeaker. Also, an indication of the point in time may be included in the signal.

The generation of at least one virtual sound source may be based on a soundfield synthesis technology. The virtual sound source may be, for example, a soundfield which gives the impression that a sound source is located in a predefined space and/or at a predefined position. For example, the use of virtual sound sources may allow the generation of spatially limited audio signals. In particular, generating a virtual sound source may be considered as a form of generating a virtual speaker throughout the three-dimensional space, including behind, above, or below the listener.

For example, for generating an impression to a listener that a sound is located behind (right/left of) the listener, a virtual sound source may be placed behind (right/left of) the listener, or at any other suitable position.

In some embodiments, the loudspeaker dependent spread factor depends on a distance of the virtual sound source to the at least one individual loudspeaker of the loudspeaker arrangement, as already described above. Thereby, the spread factor may be adjusted according to distance of the virtual sound source.

For example, if this distance of the virtual sound source to the at least one individual loudspeaker generating the virtual sound source is too high/low, it may be desirable to have a high/low directivity in order to not lose/having too much of the sound signal or wave contributing to the virtual sound source.

In some embodiments, the circuitry is further configured to, depending on the distance (of the virtual sound source to the at least one individual loudspeaker of the loudspeaker arrangement), determine a point of time at which the at least one individual loudspeaker generates a sound to generate the virtual sound source. This may refer to a delay, as already described above. Hence, thereby, the emitted sound waves of the individual loudspeakers contributing to the virtual sound source are generated such that they reach the desired position of the virtual sound source at the same point of time.

For example, if a virtual sound source is created by two or more loudspeakers, it may be desirable that the signals emitted by the two or more loudspeakers overlap at a predetermined position at which the virtual sound source is placed. Therefore, by introducing, for example, a delay of the emission of the sound signals or wave, the sound signals of the loudspeakers may be synchronized and interference, such as beat frequency, comb filtering effects, or the like, may be avoided or dampened.

In some embodiments, the loudspeaker dependent spread factor is determined according to a linear or non-linear function. In some embodiments, the non-linear function may depend one-dimensionally on the distance, or multi-dimensionally on a vector determined for an individual loudspeaker.

The vector may include coordinates, indicating a position of the individual loudspeaker. The non-linear function may further depend on time, on a multi-dimensional vector including at least one positional information and time, or the like. The non-linear function may allow a simple and/or fast calculation of the spread factor.

Using a non-linear function may lead to a better soundfield generation than using a linear function. For example, in the case that the soundfield is generated in a room where, for example, an inhomogeneous distribution of furniture may shield or avoid a good sound propagation, a non-linear function may be included in the loudspeaker dependent spread factor to address such an issue.

The non-linear function may be a cardioid function, a directive function, a sigmoidal function, or the like. In some embodiments, the non-linear function may be related to a directivity pattern, such as the directivity pattern which is described above. Hence, the non-linear function may be chosen based on the (frequency emission) type of loudspeaker, such as a tweeter, a woofer, a mid-speaker, a subwoofer, or the like. In some embodiments, the non-linear function may be transformed into a directivity pattern by coordinate transformation in order to simulate and visualize the resulting sound of the individual loudspeaker.

In some embodiments, the virtual sound source is generated by contributions from the individual loudspeakers, the contributions being amplified and delayed versions of an input audio signal.

A contribution may be a sound wave, sound pulse, or the like, emitted by the individual loudspeaker.

An input audio signal may be a signal, which is transferred to the individual loudspeaker, or, in some embodiments a desired audio signal at a predetermined position, or the like.

In some embodiments, the circuitry is further configured to adjust a gain of an individual loudspeaker of the loudspeaker arrangement. An individual loudspeaker may contribute more or less to the generation of the virtual sound source, depending on the adjusted gain, hence the adjustment of the gain may lead to an improved sound impression of a listener, for example.

The gain may be of the nature as described above. The gain may also be a factor to modulate an amplitude of a sound field, to modulate the amplitude or intensity only of certain frequencies of a sound emitted by an individual loudspeaker, such as the treble frequencies, the bass frequencies, the mid frequencies, or the like.

In some embodiments, the gain is modified by the spread factor, i.e. may depend on the spread factor or be (dynamically) adapted when the spread factor changes.

In some embodiments, the adjustment of the gain depends on the distance between a listener and the virtual sound source.

For example, in some embodiments the gain may be higher (lower) if the listener is farther (closer) to the virtual sound source. On the other hand, in some embodiments the gain may be higher (lower) if the listener is closer (farther) to the virtual sound.

In the latter case, if two sound sources (e.g. individual loudspeakers or virtual sound sources or an individual speaker and a virtual sound source), especially in the case for two different types of loudspeakers (e.g. subwoofer and tweeter) of which one is closer to the listener than the other, the gain of the one sound source closer to the listener may be increased in order to create a pleasant sound impression of the listener.

In some embodiments, the determination includes determining the position of the at least one individual loudspeaker of the loudspeaker arrangement relative to a position of a listener, as already described above. In some embodiments, the position of the listener may be a relative distance to the at least one individual loudspeaker, it may also be a three-dimensional position based on a vector. The position may include an angle relative to other loudspeakers of the loudspeaker arrangement and/or to the listener. According to the determined position, parameters may be adjusted, e.g., gain, delay, or the like, in order to generate a virtual sound source.

In some embodiments, the loudspeaker dependent spread factor is based on the formula $$\gamma_{n,l} = 1 + \frac{r_{n,min} - r_{n,l}}{\sigma_{n,l} * (r_{n,max} - r_{n,min})}, \quad (1)$$

wherein

- $\gamma_{n,l}$ is the loudspeaker dependent spread factor of the at least one individual loudspeaker of the loudspeaker arrangement;
- $r_{n,l}$ is the distance between the at least one loudspeaker of the loudspeaker arrangement and the generated virtual sound source;
- $r_{n,min}$ is the distance between the loudspeaker of the loudspeaker arrangement closest to the virtual sound source and the virtual sound source;
- $r_{n,max}$ is the distance between the loudspeaker of the loudspeaker arrangement farthest to the virtual sound source and the virtual sound source;
- $\sigma_{n,l}$ is a loudspeaker dependent spread coefficient.

The formula may be explained as follows, with reference to FIGS. 1, 2 and 3.

Figure 1:
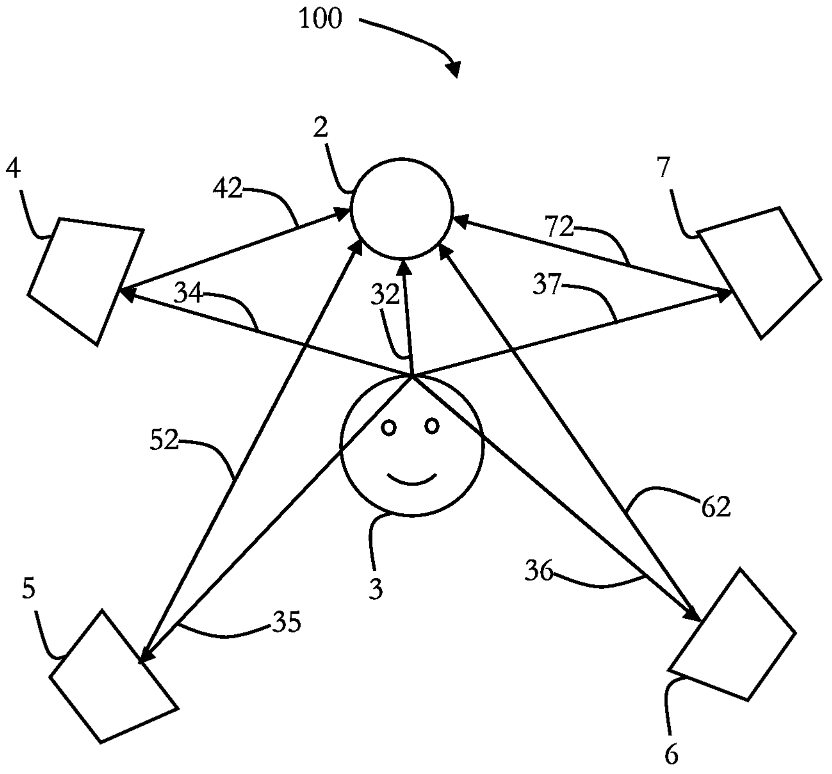
FIG. 1 depicts a system of loudspeakers generating a virtual sound source according to an embodiment of the present disclosure.

FIG. 1 shows a system 100, including a virtual sound source 2, a user 3, and a loudspeaker arrangement including loudspeakers 4, 5, 6, 7.

Arrows 32, 34, 35, 36, 37, 42, 52, 62, 72 indicate vectors, wherein the reference signs of the arrows indicate the beginning and the end of the respective vectors, such that an exemplary vector XY, wherein X and Y are chosen from the reference sign pool 2, 3, 4, 5, 6, 7 starts at the element with the reference sign X and ends at the element with the reference sign Y. For example, arrow 32 illustrates a vector starting at the user 3 and ending at the virtual sound source 2, arrow 35 illustrates a vector starting at the user 3 and ending at the loudspeaker 5, arrow 62 illustrates a vector starting at the loudspeaker 6 and ending at the virtual sound source 2, etc.

The virtual sound source 2 is depicted as an expanded object. However, this is only for illustrational purposes and in this embodiment, it is assumed that the virtual sound source is a point source. Therefore, the vectors 32, 42, 52, 62, 72 are considered to end in the same point, although they are depicted ending in different points.

Moreover, for illustrational purposes, a two-dimensional arrangement of the elements 2 to 7 is depicted. However, this embodiment is not limited to a two-dimensional arrangement. In general, a three-dimensional arrangement should be considered.

Furthermore, for illustrational purposes, only one virtual sound source is depicted. However, the present disclosure is not limited to one virtual sound source. Other embodiments may refer to any number of virtual sound sources larger than one.

Hence, in this embodiment, a plurality of virtual sound sources is assumed.

The number of loudspeakers is not limited to be four. It may further be 2, 3 or any number larger than 4.

To explain the formula, the variables and how they may exemplarily be retrieved are described in the following.

At first, the distances between each virtual sound source n and each respective loudspeaker 1 (in Cartesian coordinates) are determined, e. g. by determining the norm of the associated vectors X2, wherein in this case X is an element of {4, 5, 6, 7}, resulting in the distance r:

$$r_{n,l} = \sqrt{(m_{n,x} - X_{1,x})^2 + (m_{n,y} - X_{1,y})^2 + (m_{n,z} - X_{1,z})^2} \quad (2)$$

wherein the index n refers to a virtual sound source (2) of the plurality of the virtual sound sources, l refers to a loudspeaker (4 to 7) of the loudspeaker arrangement, m refers to a vector of the virtual sound source 2, X refers to a vector of a loudspeaker 4 to 7 of the loudspeaker arrangement, indexes x, y and z respectively refer to x-, y- and z-coordinates of a vector in a three-dimensional space.

For example $r_{2,5}$ may refer to the distance between the virtual sound source 2 and the loudspeaker 5, $m_{2,x}$ may refer to the x-coordinate of the virtual sound source 2, $X_{5,y}$ may refer to the y-coordinate of the loudspeaker 5, etc.

At second, gains G for each loudspeaker with respect to the virtual sound sources are determined according to equation $$G_{n,l} = \frac{1}{\sqrt{1 + r_{n,l}^2}}. \quad (3)$$

However, the present disclosure is not limited to the determination of the gains in this way and any other way to determine a gain is possible. For example, the value of the gain may be of dimensionless character or have other dimensions. It is also possible, depending on, for example, a loudspeaker type of the loudspeakers 4 to 7, to use another way of determining a gain than for other loudspeakers 4 to 7 in the same system.

At third, delays D for each loudspeaker 4 to 7 with respect to the virtual sound sources 2 are determined according to equation $$D_{n,l} = \left\lfloor \frac{r_{n,l}}{c_0 T_s} \right\rfloor, \quad (4)$$

wherein $c_0$ refers to a sound celerity and $T_s$ refers to a sampling period. However, the present disclosure is not limited to the determination of the delay in this way and any other way to determine a delay is possible. For example, the delay may not be a rounded value, the delay may be of a dimension of time, space, or the like. It is also possible, depending on, for example, a loudspeaker type of the loudspeakers 4 to 7 to use another way of determining a delay than for other loudspeakers 4 to 7 in the same system.

These first three steps may be performed iteratively for each loudspeaker 4 to 7 and for each sound source 2. However, they may only be performed for one loudspeaker, for example the loudspeaker 4, and one virtual sound source, for example the virtual sound source 2, or for a subset of loudspeakers 4 to 7 and a subset of sound sources 2. These first three steps may be performed in another ordering as well, for example exchanging the second and the third step, without limiting the present disclosure in that regard.

The fourth step may include the determining of a minimum distance $r_{n,min}$ and a maximum distance $r_{n,max}$ between a virtual sound source 2 (e.g. n=2) and the loudspeakers 4 to 7 of the loudspeaker arrangement for every virtual sound source 2.

The fifth step may be the calculation of a spread factor similar to the spread factor as described above with the formula $$\gamma_{n,l} = 1 + \frac{r_{n,min} - r_{n,l}}{\sigma_n * (r_{n,max} - r_{n,min})}, \quad (5)$$

wherein $\sigma_n$ is a spread coefficient of the virtual sound source n. The spread coefficient may in some embodiments have the property to be a positive value.

The sixth step may be a condition which is applied to $\gamma_{n,l}$, the condition including:

$$\text{If } \gamma_{n,l}>0, \text{ then } G_{n,l}=\gamma_{n,l}*G_{n,l}, \text{ else } G_{n,l}=0 \quad (6).$$

The fifth and sixth step may be performed iteratively for each loudspeaker 4 to 7 or to a single loudspeaker 4 or to a subset of loudspeakers of the loudspeakers 4 to 7.

For a spread coefficient $\sigma_n=1$, a result is a linear decrease of the spread factor $\gamma_{n,l}$ from $\gamma_{n,min}=1$ to $\gamma_{n,max}=0$ between the closest speaker $r_{n,min}$ and the farthest $r_{n,max}$. A larger spread coefficient with the extreme case of $\sigma_n\rightarrow\infty$ converges to identity ($\gamma_{n,l}=1$), whereas a smaller one with the extreme case of $\sigma_n=0$ increases the directivity ($\gamma_{n,l}\rightarrow-\infty$). In this latter case, only the closest loudspeaker to the source is emitting a sound ($\gamma_{n,min}=1$, $\gamma_{n,l\neq min}\rightarrow-\infty$, $G_{n,l\neq min}=0$).

Figure 2:
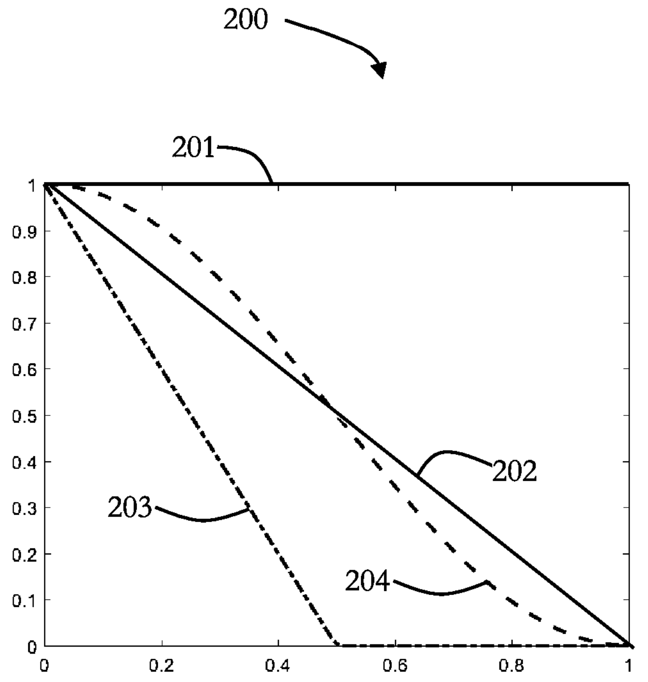
FIG. 2 is a coordinate system diagram including different spread factors according to an embodiment of the present disclosure.

FIG. 2 is a diagram of a coordinate system 200 including different types of spread factors $\gamma_{n,l}$ (ordinate) as functions of the normalized distance (abscissa), wherein $r_{min}$ corresponds to a distance of zero and $r_{max}$ correspond to a distance of 1.

The functions include an identity function 201, linear decrease function 202, a directive function 203 in the case that the spread coefficient is 0.5, and a cardioid function 204. The functions are not limited to be functions as displayed in this context. Any other function for the spread factor may also be derived and implemented, such as an omnidirectional function, a directional function, a super-directional function, a bidirectional function, a figure of eight function, a subcardioid function, a cardioid function, a unidirectional function, a supercardioid function, a hypercardioid function, or the like.

Figure 3:
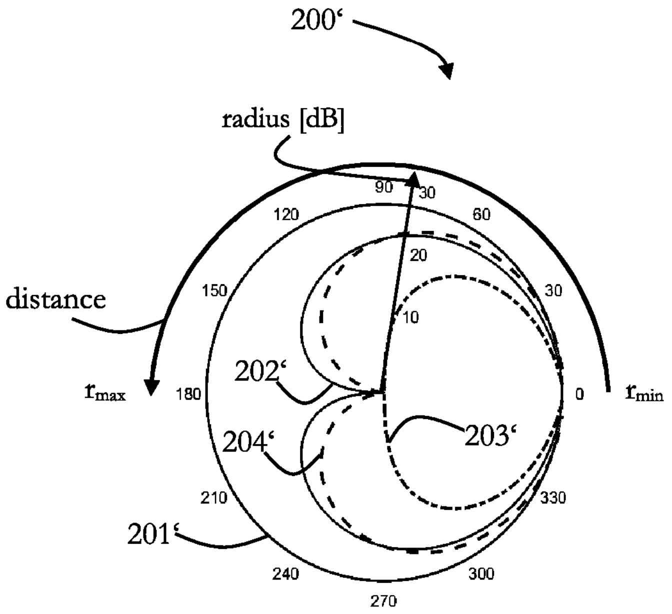
FIG. 3 is a polar coordinate system diagram including different spread factors according to an embodiment of the present disclosure.

The functions may be transformed into polar coordinates as depicted in FIG. 3.

FIG. 3 shows a diagram of a polar coordinate system 200' including different types of spread factors (radius) as functions of a normalized angle, wherein $r_{min}$ corresponds to an angle of zero degrees and $r_{max}$ correspond to an angle of 180 degrees.

FIG. 3 further includes a first scale for the distance r (corresponding to the distance of FIG. 2) transformed into a polar angle from zero degrees to 180 degrees and a radius illustrating a gain level from zero dB (decibels) to 30 dB.

The polar coordinate system 200' may be derived by a coordinate transform of the ordinate of the coordinate system 200 by assigning the values [0; 1] of the coordinate system 200 linearly to the values [0°; 180° ]. Therefore, the functions of FIG. 3 may be interpreted as another illustration of the function of FIG. 2, having an identity 201', a linear decrease ($\sigma_n=1$) 202', a directive function 203' ($\sigma_n=0.5$), and a cardioid function 204' assigned to the second scale 202. Any other function, which is transformable from a linear system to a polar system, may also be used in this context, such as an omnidirectional function, a directional function, a super-directional function, a bidirectional function, a figure of eight function, a subcardioid function, a cardioid function, a unidirectional function, a supercardioid function, a hypercardioid function, or the like.

Without limiting the present disclosure in this respect, for the sake of parametrization, the spread coefficients may be limited to the range of [0; 1] (in other embodiments, any other interval may be used).

Furthermore, a parameter directivity gain, or DirGain may be introduced, which may be multiplied with the spread coefficient in order to obtain any number of the field of real numbers.

Moreover, a parameter $\text{angle}_l$ may be introduced. The $\text{angle}_l$ may be dependent on a type of loudspeaker of the loudspeakers 4 to 7, on the position, of the posture, or the like. The $\text{angle}_l$ may be determined by an apparatus according to an embodiment of the present disclosure either by measurement of loudspeaker 4 dependent properties or may be taken from a database, such as a database saved in circuitry within the loudspeaker 4 or from the internet, or the like.

Herewith, a speaker dependent spread coefficient may be introduced based on the formula $$\sigma_{n,l}=\sigma_n*\text{DirGain}*\text{angle}_l \quad (7).$$

The speaker dependent spread coefficient may replace the spread coefficient $\sigma_n$ in formula (5), resulting in formula (1):

$$\gamma_{n,l} = 1 + \frac{r_{n,min} - r_{n,l}}{\sigma_{n,l} * (r_{n,max} - r_{n,min})}. \quad (1)$$

Some embodiments pertain to a method, including determining a loudspeaker dependent spread factor for at least one individual loudspeaker of a loudspeaker arrangement, wherein the loudspeaker dependent spread factor depends on a specifications of the at least one individual loudspeaker; and controlling the outputs of the loudspeakers of the loudspeaker arrangement based on the loudspeaker dependent spread factor for the at least one individual loudspeaker to generate at least one virtual sound source, as discussed above.

The method may be performed on an apparatus as described above or by any other apparatus, device, processor, circuitry or the like.

The loudspeaker dependent spread factor may depend on a distance of the virtual sound source to the at least one individual loudspeaker of the loudspeaker arrangement, as discussed herein, wherein based on the determined distance of the virtual sound source to the at least one individual loudspeaker of the loudspeaker arrangement a point of time is determined at which the at least one individual loudspeaker generates a sound to generate the virtual sound source, as discussed herein.

The loudspeaker dependent spread factor may further be determined according to a non-linear function, as discussed herein, which may depend on a distance of an individual loudspeaker of the loudspeaker arrangement to the virtual sound source, as discussed herein.

The method may further include that the virtual sound source is generated by contributions from the individual loudspeakers, the contributions being amplified and delayed versions of an input audio signal, as discussed herein.

The method may further including adjusting a gain of an individual loudspeaker of the loudspeaker arrangement, wherein the gain may be modified by the spread factor, as discussed herein, wherein the adjustment of the gain may further depend on the distance between a listener and the virtual sound source, as discussed herein, in specific wherein the gain of a loudspeaker closest to the listener may be higher than the gain of the loudspeakers of the loudspeaker arrangement, as discussed herein.

The method may further comprise determining the position of the at least one individual loudspeaker of the loudspeaker arrangement relative to a position of a listener, as discussed herein.

The method may further comprise determining the loudspeaker dependent spread factor based on the formula (1) as discussed herein.

Figure 4:
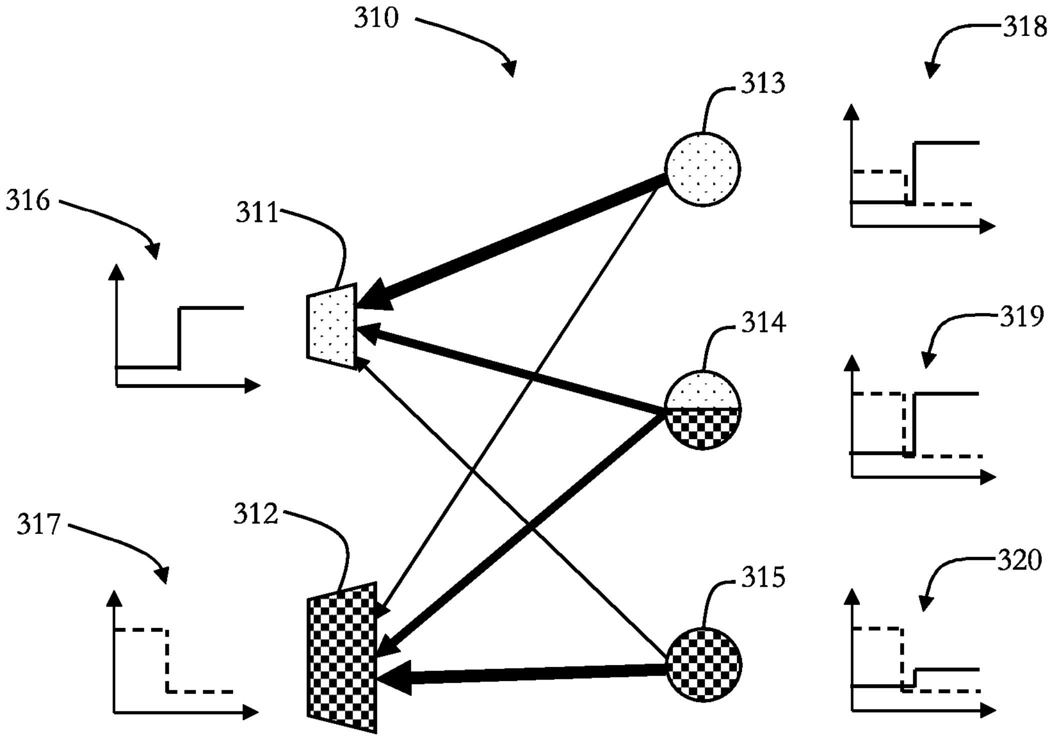
FIG. 4 illustrates a situation which is addressed by the present disclosure.

The introduction of a spread factor as discussed herein may address the following situation, which is discussed with reference to FIG. 4. FIG. 4 illustrates a system 310 including two loudspeakers 311 and 312. For this example, the loudspeakers 311 and 312 are assumed to be located in a car. The loudspeakers 311 and 312 may have different frequency ranges, i.e. in this example, the loudspeaker 311 is a tweeter, and the loudspeaker 312 is a woofer.

The loudspeakers 311 and 312 generate three virtual sound sources 313, 314 and 315.

The frequency range of the loudspeaker 311 (312) is depicted in diagram 316 (317). The abscissa of diagram 316 (317) represents the frequency of the loudspeaker 311 (312), the ordinate represents the gain of the loudspeaker 311 (312).

The frequency range of virtual sound source 313 (314, 315) is depicted in diagram 318 (319, 320). The abscissa of diagram 318 (319, 320) represents the frequency of the virtual sound source 313 (314, 315), the ordinate represents the gain of the virtual sound sources 313 (314, 315).

As can be taken by the thicknesses of the depicted arrows between the loudspeakers 311 and 312 and the virtual sound sources 313 to 315, the influence of the loudspeaker 311 (312) dominates compared to the loudspeaker 312 (311) in generating the virtual sound source 313 (315), whereas both loudspeakers 311 and 312 contribute equally to the generation of the virtual sound 314.

Generally, this may lead to the result that frequencies of the loudspeaker 311 may be perceived predominantly for the virtual sound source 313 as can be taken from the diagram 318. This may also apply to the predominant perception of timbre of the loudspeaker 312 for the virtual sound source 315 as can be taken from the diagram 320. The diagram 319 shows that the frequencies of both loudspeakers 311 and 312 may be perceived equally for the virtual sound source 314.

However, applying a spread factor according to the present disclosure, as described herein, may cause that the perception of timbre emitted by a plurality of loudspeakers may be (nearly) equal for every virtual sound source of a plurality of virtual sound sources generated by the plurality of loudspeakers.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

In the following, an embodiment of an apparatus is discussed under reference of FIG. 5, which depicts a block diagram of an apparatus implemented as an audio system 400 (or optionally as electronic device 401).

The audio system 400 comprises an electronic device 401 that is connected to a microphone arrangement 410, a speaker arrangement 411, a user interface 412, and sensor 413. The electronic device 401 is a 3D sound rendering system in this embodiment.

The electronic device 401 has a CPU 402 as processor, a data storage 403 and a data memory 404 (here a RAM).

The data memory 404 is arranged to temporarily store or cache data and/or computer instructions for processing by the processor 402.

The data storage 403 is provided for storing record sensor data obtained from e.g. the microphone arrangement 410.

The electronic device 401 is configured to execute software for a 3D audio rendering operation, which virtually places a sound source anywhere inside a room, including behind, above or below a listener, such as listener 3 of FIG. 1.

The electronic device 401 has a WLAN interface 405, a Bluetooth interface 406, and an Ethernet interface 407. These interfaces 405, 406, 407 act as I/O interfaces for data communication with external devices.

For example, a smartphone may be connected to the 3D sound rendering system by means of the Bluetooth interface 406 and/or the WLAN interface 405. Additional loudspeakers, microphones, and video cameras with Ethernet, WLAN or Bluetooth connection may be coupled to the electronic device 401 via these wireless/wire interfaces 405, 406, and 407.

The microphone arrangement 410 may be composed of one or more microphones distributed around a listener, for example.

The user interface 412 is connected to the processor 402. The user interface 412 acts as a human-machine interface and allows for a dialogue between an administrator and the audio system 400.

The sensors 413 are connected to the processor 402. The sensors 413 include a temperature sensor and a video camera. The sensors 413 are configured to obtain the presence and the position of one or more listeners and a head position and orientation of the listener. The video cameras may be distributed over a predefined space, or a single camera can be used to obtain an image.

The audio system 400, by means of microphone array 410, receives audio data from the loudspeakers of the loudspeaker arrangement 411 and at least one virtual sound source (e.g. virtual sound source 2, FIG. 1) in order to monitor the generated virtual sound sources (e.g. virtual sound source 2, FIG. 1) and, if necessary, to regulate the loudspeaker arrangement 411 for influencing the generated virtual sound source(s).

Figure 6:
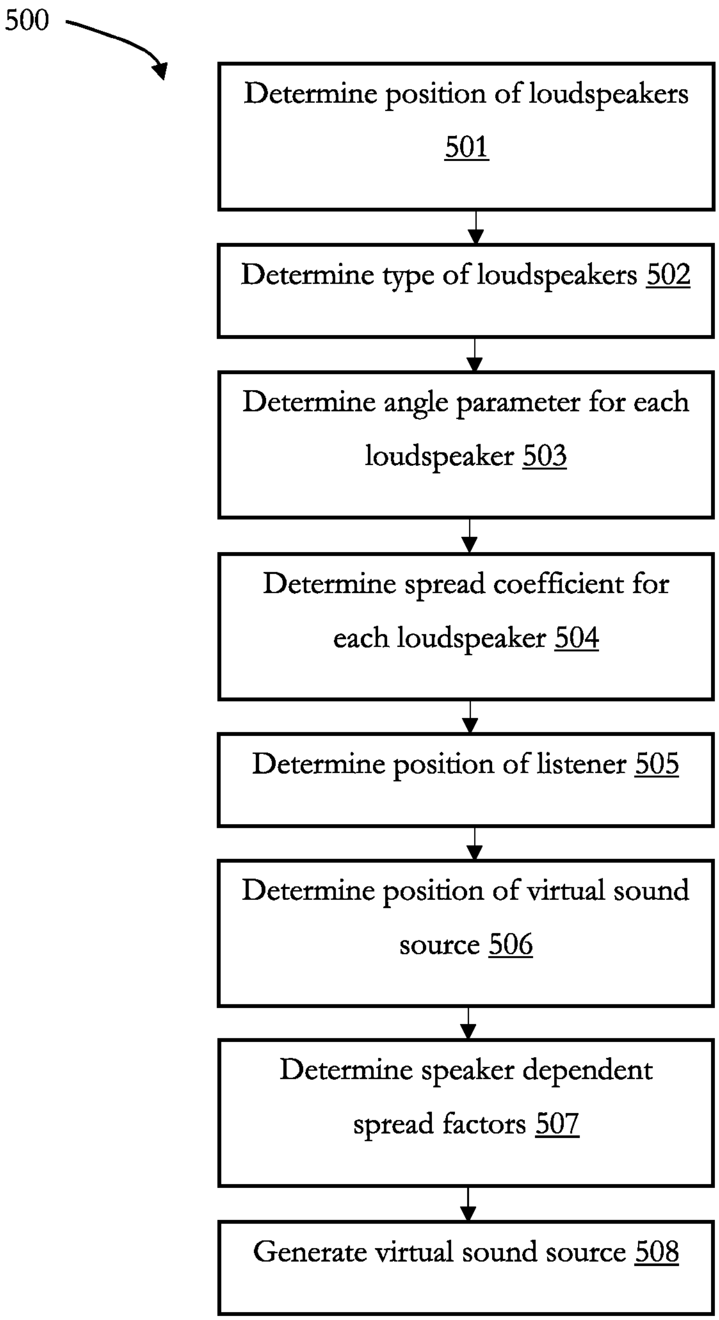
FIG. 6 depicts a method for generating a virtual sound source according to an embodiment of the present disclosure.

FIG. 6 depicts a flowchart of an embodiment of a method 500 for generating a virtual sound source according to an embodiment of the present disclosure, wherein the method 500 is performed by the audio system 400 of FIG. 5.

First, in 501, the position of the loudspeakers are determined. This may be performed by object recognition technology with an image generating system, using mapping techniques, such as SLAM (Simultaneous Localization and Mapping), by sensor measurement of the position of the loudspeakers, for example by radar based methods, by acquiring, via a user interface, an input of a user indicating the position of the loudspeakers, without limiting the present disclosure in that respect.

Then, in 502, the type of loudspeakers are determined, for example by reading a loudspeaker intrinsic database, by acquiring, via a user interface, an input of a user indicating the type of loudspeakers, or the like.

In 503, an angle parameter, such as the $\text{angle}_l$, as described above is determined. The information about the angle parameter is provided implicitly in the type of loudspeakers, or it is taken from a database similar to the database in 501, or acquired via a user interface, such as in 502 or 503.

In 504, spread coefficients are determined, which depend on the type of loudspeaker in this embodiment and, therefore, are implicitly defined by the type of loudspeaker. Optionally, they are taken from a database, via a user input, or the like, as described above.

In 505, the position of a listener is determined by using one of the techniques as described in 501 for determining the position of the loudspeaker, or the listener may input, via a user interface, at which position he is.

In 506, the position of the virtual sound source is determined. It should be noted that the virtual sound source might not be generated at this point of time. Therefore, this step may be understood as the determination of where the virtual sound source will be at a future point of time. However, without limiting the present disclosure to any of these cases, the position of the virtual sound source may be determined depending on the listener's position, for example two meters in front of a listeners face, the loudspeakers' position, for example the balance point of the loudspeakers geometry, on parameters which include both positions, or by an input via a user interface.

In 507, the speaker dependent spread factors are determined according to formula (5), as described herein, without limiting the present disclosure in that respect.

In 508, a virtual sound source is generated by applying all the determined parameters to a computer program, as it may be performed, for example in the electronic device 401.

Figure 7:
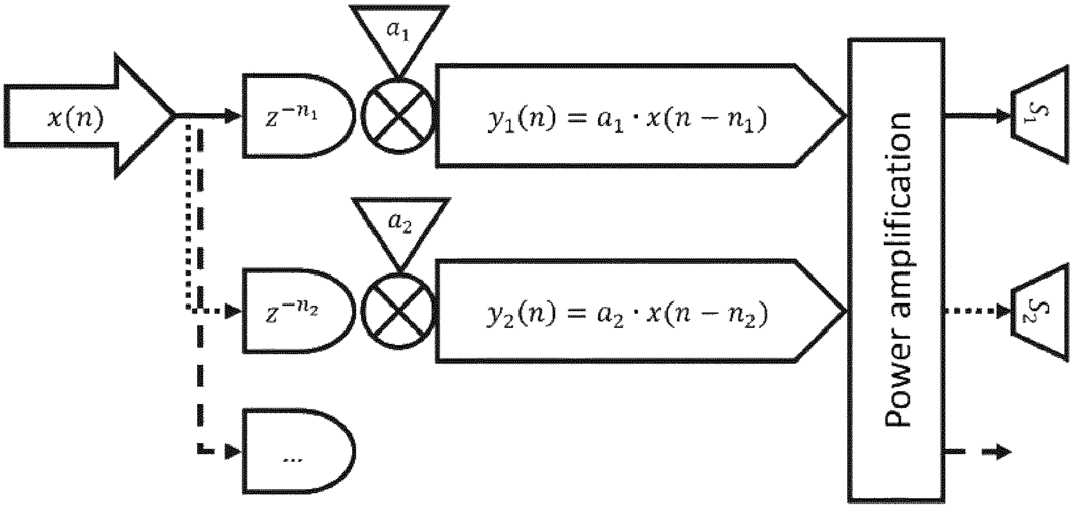
FIG. 7 provides an embodiment of a 3D audio rendering that is based on a digitalized Monopole Synthesis algorithm.

In some embodiments, a 3D audio rendering is implemented which is based on a digitalized Monopole Synthesis algorithm, which is discussed under reference of FIG. 7 in the following.

A target sound field is modelled as at least one target monopole placed at a defined target position. In one embodiment, the target sound field is modelled as one single target monopole. In other embodiments, the target sound field is modelled as multiple target monopoles placed at respective defined target positions. For example, each target monopole may represent a noise cancellation source comprised in a set of multiple noise cancelation sources positioned at a specific location within a space. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where p=1, . . . , N is the index of the respective synthesis monopole used for synthesizing the target monopole signal. The delay and amplification units according to this embodiment may apply equation (117) of reference US 2016/0037282 A1 to compute the resulting signals $y_p(n)=s_p(n)$ which are used to synthesize the target monopole signal. The resulting signals $s_p(n)$ are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$.

Further, according to this embodiment, the amplification factor $$a_p = \frac{\rho c}{R_{p0}}$$

is inversely proportional to the distance $r=R_{p0}$.

In alternative embodiments of the system, the modified amplification factor according to equation (118) of reference US 2016/0037282 A1 can be used.

It should be recognized that the embodiments describe a method 500 with an exemplary ordering of method steps. The specific ordering of method steps is however given for illustrative purposes only and should not be construed as binding. For example the ordering of 502 to 508 in the embodiment of FIG. 6 may be arbitrarily exchanged.

Please note that the division of the electronic device 401 into units 401 to 407 is only made for illustration purposes and that the present disclosure is not limited to any specific division of functions in specific units. For instance, the electronic device 401 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus including circuitry configured to:
- determine a loudspeaker dependent spread factor for at least one individual loudspeaker of a loudspeaker arrangement, wherein the loudspeaker dependent spread factor depends on a specification of the at least one individual loudspeaker; and
- control the outputs of the loudspeakers of the loudspeaker arrangement based on the loudspeaker dependent spread factor for the at least one individual loudspeaker to generate at least one virtual sound source.

(2) The apparatus of (1), wherein the loudspeaker dependent spread factor depends on a distance of the virtual sound source to the at least one individual loudspeaker of the loudspeaker arrangement.

(3) The apparatus of anyone of (1) or (2), wherein the circuitry is further configured to, depending on the distance, determine a point of time at which the at least one individual loudspeaker generates a sound to generate the virtual sound source.

(4) The apparatus of anyone of (1) to (3), wherein the loudspeaker dependent spread factor is determined according to a non-linear function.

(5) The apparatus of anyone of (1) to (4), wherein the non-linear function depends on a distance of an individual loudspeaker of the loudspeaker arrangement to the virtual sound source.

(6) The apparatus of anyone of (1) to (5), wherein the virtual sound source is generated by contributions from the individual loudspeakers, the contributions being amplified and delayed versions of an input audio signal.

(7) The apparatus of anyone of (1) to (6), wherein the circuitry is further configured to adjust a gain of an individual loudspeaker of the loudspeaker arrangement, wherein the gain is modified by the spread factor.

(8) The apparatus of anyone of (1) to (7), wherein the adjustment of the gain depends on the distance between a listener and the virtual sound source.

(9) The apparatus of anyone of (1) to (8), wherein the gain of a loudspeaker closest to the listener is higher than the gain of the other loudspeakers of the loudspeaker arrangement.

(10) The apparatus of anyone of (1) to (9), wherein the loudspeaker dependent spread factor is based on the formula $$\gamma_{n,l} = 1 + \frac{r_{n,min} - r_{n,l}}{\sigma_{n,l} * (r_{n,max} - r_{n,min})},$$

wherein $\gamma_{n,l}$ is the loudspeaker dependent spread factor of the at least one individual loudspeaker of the loudspeaker arrangement;

$r_{n,l}$ is the distance between the at least one loudspeaker of the loudspeaker arrangement and the generated virtual sound source;

$r_{n,min}$ is the distance between the loudspeaker of the loudspeaker arrangement closest to the virtual sound source and;

$r_{n,max}$ is the distance between the loudspeaker of the loudspeaker arrangement farthest to the virtual sound source and;

$\sigma_{n,l}$ is a loudspeaker dependent spread coefficient.

(11) A method including:

determining a loudspeaker dependent spread factor for at least one individual loudspeaker of a loudspeaker arrangement, wherein the loudspeaker dependent spread factor depends on a specification of the at least one individual loudspeaker; and controlling the outputs of the loudspeakers of the loudspeaker arrangement based on the loudspeaker dependent spread factor for the at least one individual loudspeaker to generate at least one virtual sound source.

(12) The method of (11), wherein the loudspeaker dependent spread factor depends on a distance of the virtual sound source to the at least one individual loudspeaker of the loudspeaker arrangement.

(13) The method of anyone of (11) or (12), the method further including, depending on the distance, determining a point of time at which the at least one individual loudspeaker generates a sound to generate the virtual sound source.

(14) The method of anyone of (11) to (13), wherein the loudspeaker dependent spread factor includes a non-linear function.

(15) The method of anyone of (11) to (14), wherein the non-linear function depends on a distance of an individual loudspeaker of the loudspeaker arrangement to the virtual sound source.

(16) The method of anyone of (11) to (15), wherein the virtual sound source is generated by contributions from the individual loudspeakers, the contributions being amplified and delayed versions of an input audio signal.

(17) The method of anyone of (11) to (16), the method further including adjusting a gain of an individual loudspeaker of the loudspeaker arrangement, wherein the gain is modified by the spread factor.

(18) The method of anyone of (11) to (17), wherein the adjustment of the gain depends on the distance between a listener and the virtual sound source.

(19) The method of anyone of (11) to (18), wherein the gain of a loudspeaker closest to the listener is higher than the gain of the other loudspeakers of the loudspeaker arrangement.

(20) The method of anyone of (11) to (19), wherein the loudspeaker dependent spread factor is based on the formula $$\gamma_{n,l} = 1 + \frac{r_{n,min} - r_{n,l}}{\sigma_{n,l} * (r_{n,max} - r_{n,min})},$$

wherein $\gamma_{n,l}$ is the loudspeaker dependent spread factor of the at least one individual loudspeaker of the loudspeaker arrangement;

$r_{n,l}$ is the distance of the at least one loudspeaker of the loudspeaker arrangement to the generated virtual sound source;

$r_{n,min}$ is the distance of the loudspeaker of the loudspeaker arrangement closest to the virtual sound source;

$r_{n,max}$ is the distance of the loudspeaker of the loudspeaker arrangement farthest to the virtual sound source;

$\sigma_{n,l}$ is a loudspeaker dependent spread coefficient.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An apparatus comprising circuitry configured to:

determine a loudspeaker dependent spread factor for at least one individual loudspeaker of loudspeakers of a loudspeaker arrangement, the loudspeaker dependent spread factor depending on a specification of the at least one individual loudspeaker, the specification of the at least one individual loudspeaker including at least a type of the at least one individual loudspeaker, a type of membrane of the at least one individual loudspeaker, and a directivity pattern of the at least one loudspeaker; and control outputs of the loudspeakers of the loudspeaker arrangement based on the loudspeaker dependent spread factor for the at least one individual loudspeaker to generate at least one virtual sound source.

2. The apparatus of claim 1, wherein the loudspeaker dependent spread factor depends on a distance of the virtual sound source to the at least one individual loudspeaker of the loudspeaker arrangement.

3. The apparatus of claim 2, wherein the circuitry is further configured to, depending on the distance, determine a point of time at which the at least one individual loudspeaker generates a sound to generate the virtual sound source.

4. The apparatus of claim 1, wherein the loudspeaker dependent spread factor is determined according to a non-linear function.

5. The apparatus of claim 4, wherein the non-linear function depends on a distance of an individual loudspeaker of the loudspeaker arrangement to the virtual sound source.

6. The apparatus of claim 5, wherein the virtual sound source is generated by contributions from the loudspeakers of the loudspeaker arrangement, the contributions being amplified and delayed versions of an input audio signal.

7. The apparatus of claim 1, wherein the circuitry is further configured to adjust a gain of an individual loudspeaker of the loudspeaker arrangement, the gain being modified by the loudspeaker dependent spread factor.

8. The apparatus of claim 7, wherein adjustment of the gain depends on a distance between a listener and the virtual sound source.

9. The apparatus of claim 8, wherein a gain of a loudspeaker closest to the listener is higher than a gain of other loudspeakers of the loudspeaker arrangement.

10. The apparatus of claim 1, wherein the loudspeaker dependent spread factor is based on the formula $$\gamma_{n,l} = 1 + \frac{r_{n,min} - r_{n,l}}{\sigma_{n,l} * (r_{n,max} - r_{n,min})},$$

wherein $\gamma_{n,l}$ is the loudspeaker dependent spread factor of the at least one individual loudspeaker of the loudspeaker arrangement;

$r_{n,l}$ is a distance between the at least one loudspeaker of the loudspeaker arrangement and the generated virtual sound source;

$r_{n,min}$ is a distance between the loudspeaker of the loudspeaker arrangement closest to the virtual sound source and the virtual sound source;

$r_{n,max}$ is a distance between the loudspeaker of the loudspeaker arrangement farthest to the virtual sound source and the virtual sound source;

$\sigma_{n,l}$ is a loudspeaker dependent spread coefficient.

11. A method, comprising:

determining a loudspeaker dependent spread factor for at least one individual loudspeaker of loudspeakers of a loudspeaker arrangement, the loudspeaker dependent spread factor depending on a specification of the at least one individual loudspeaker, the specification of the at least one individual loudspeaker including at least a type of the at least one individual loudspeaker, a type of membrane of the at least one individual loudspeaker, and a directivity pattern of the at least one loudspeaker; and controlling outputs of the loudspeakers of the loudspeaker arrangement based on the loudspeaker dependent spread factor for the at least one individual loudspeaker to generate at least one virtual sound source.

12. The method of claim 11, wherein the loudspeaker dependent spread factor depends on a distance of the virtual sound source to the at least one individual loudspeaker of the loudspeaker arrangement.

13. The method of claim 12, the method further comprising, depending on the distance, determining a point of time at which the at least one individual loudspeaker generates a sound to generate the virtual sound source.

14. The method of claim 11, wherein the loudspeaker dependent spread factor is determined according to a non-linear function.

15. The method of claim 14, wherein the non-linear function depends on a distance of an individual loudspeaker of the loudspeaker arrangement to the virtual sound source.

16. The method of claim 15, wherein the virtual sound source is generated by contributions from the loudspeakers of the loudspeaker arrangement, the contributions being amplified and delayed versions of an input audio signal.

17. The method of claim 11, the method further comprising adjusting a gain of an individual loudspeaker of the loudspeaker arrangement, the gain being modified by the spread factor.

18. The method of claim 17, wherein adjustment of the gain depends on a distance between a listener and the virtual sound source.

19. The method of claim 18, wherein a gain of a loudspeaker closest to the listener is higher than a gain of other loudspeakers of the loudspeaker arrangement.

20. The method of claim 11, wherein the loudspeaker dependent spread factor is based on the formula $$\gamma_{n,l} = 1 + \frac{r_{n,min} - r_{n,l}}{\sigma_{n,l} * (r_{n,max} - r_{n,min})},$$

wherein $\gamma_{n,l}$ is the loudspeaker dependent spread factor of the at least one individual loudspeaker of the loudspeaker arrangement;

$r_{n,l}$ is a distance of the at least one loudspeaker of the loudspeaker arrangement to the generated virtual sound source;

$r_{n,min}$ is a distance between the loudspeaker of the loudspeaker arrangement closest to the virtual sound source and the virtual sound source;

$r_{n,max}$ is a distance of the loudspeaker of the loudspeaker arrangement farthest to the virtual sound source and the virtual sound source;

$\sigma_{n,l}$ is a loudspeaker dependent spread coefficient.

* * * * *